United States Patent [19]

Kalina

[11] Patent Number: 4,982,568
[45] Date of Patent: Jan. 8, 1991

[54] METHOD AND APPARATUS FOR CONVERTING HEAT FROM GEOTHERMAL FLUID TO ELECTRIC POWER

[76] Inventor: Alexander I. Kalina, 105 Glen Garry Way, Hillsborough, Calif. 94010

[21] Appl. No.: 327,299

[22] Filed: Mar. 22, 1989

Related U.S. Application Data

[63] Continuation-in-part of Ser. No. 295,829, Jan. 11, 1989, abandoned.

[51] Int. Cl.$^5$ .................... F01K 25/06; F03G 7/00
[52] U.S. Cl. .................... 60/649; 60/641.2; 60/653; 60/671; 60/679
[58] Field of Search ............ 60/641.2, 651, 653, 60/649, 671, 673, 679, 692, 691

[56] References Cited

U.S. PATENT DOCUMENTS

| | | | |
|---|---|---|---|
| 4,346,561 | 8/1982 | Kalina | 60/673 |
| 4,489,563 | 12/1984 | Kalina | 60/673 |
| 4,548,043 | 10/1985 | Kalina | 60/673 |
| 4,586,340 | 5/1986 | Kalina | 60/673 |
| 4,604,867 | 8/1986 | Kalina | 60/653 |
| 4,732,005 | 3/1988 | Kalina | 60/673 |
| 4,763,480 | 8/1988 | Kalina | 60/649 |

OTHER PUBLICATIONS

Burns & McDonnell Engineering Co., "Heber Geothermal Binary Demonstration Plant: Design, Construction, and Early Startup," prepared for Electric Power Research Institute, pp. 2, 4, 9–10, 24–25, 55–56, 10/1987.
Bliem, "Aspects of the Kalina Technology Applied to Geothermal Power Production," prepared for the U.S. Dept. of Energy Idaho Operation's Office, pp. 14, 20, 26, 9/1989.

Primary Examiner—Stephen F. Husar
Attorney, Agent, or Firm—Arnold, White & Durkee

[57] ABSTRACT

A method and apparatus for implementing a thermodynamic cycle, which includes heating and preferably partially evaporating a multicomponent liquid working stream with heat released from the partial condensation of a returning spent stream. The preferably partially evaporated working stream is then completely evaporated with heat transferred from an external heat source, which is preferably a geothermal heat source. The evaporated stream is expanded to produce the spent stream, which, in turn, is condensed to produce the multicomponent liquid working stream.

33 Claims, 3 Drawing Sheets

METHOD AND APPARATUS FOR CONVERTING HEAT FROM GEOTHERMAL FLUID TO ELECTRIC POWER

BACKGROUND OF THE INVENTION

This is a continuation-in-part application of Ser. No. 295,829, filed Jan. 11, 1989, abandoned.

1. Field of the Invention

This invention relates generally to methods and apparatus for transforming thermal energy from a heat source into mechanical and then electrical form using a working fluid that is expanded and regenerated. This invention further relates to a method and apparatus for improving the thermal efficiency of a thermodynamic cycle via the heating of a multicomponent liquid working stream with heat released by the partial condensation of an expanded spent stream.

2. Brief Description of the Background Art

Methods for converting the thermal energy, that geothermal fluid releases, into electric power presents an important and growing area of energy generation. Geothermal power plants generally belong to one of two categories: namely, steam plants and binary plants In steam plants, the geothermal source is utilized directly to produce steam. That steam is then expanded in a turbine, producing power. In binary plants, heat extracted from the geofluid is used to evaporate a working fluid that circulates within the power cycle. That working fluid is then expanded in a turbine, producing power.

One problem resulting from the use of a geothermal source is that geofluid (brine) can generally be cooled to moderate temperatures only. The reason for this is believed to be that further cooling can cause precipitation of silica, which may plug heat exchanger surfaces. Typically, geothermal brine may not be cooled to a temperature less than 160°-180° F. Once it reaches that temperature, it should be rejected into the geothermal strata.

The most advanced technology currently being used to convert the heat from geothermal heat sources into electric power appears to be the so-called supercritical organic Rankine cycle. That process, however, is associated with significant losses, which appear to result for the following reasons working fluid, after being condensed at ambient temperature, has to be heated by a geothermal brine which has a relatively high temperature, for the reasons stated above. As a result of such a mismatch between the temperature of the working fluid and the relatively high temperature of the geothermal brine, thermodynamic losses are incurred, leading to relatively low efficiency.

For example, the advanced geothermal power plant that is located at Heber, Calif., appears to have a thermal efficiency of about 13.2%. In contrast, the theoretical limit for the border condition at Heber is apparently about 27.15%. Thus, what appears to be the most advanced geothermal plant has a thermodynamic, or Second Law, efficiency of apparently about 48.62%. The efficiency of the subcritical organic Rankine cycle, which is widely used for geothermal application, is, of course, even lower than the efficiency of the supercritical organic Rankine cycle being used at Heber.

Replacing conventional systems, which use the thermal energy of geothermal fluids for relatively low temperature processes, with a system that more adequately matches the temperature of the working fluid with the temperature of the geothermal source may substantially reduce thermodynamic losses resulting from the temperature mismatching of conventional systems. Reducing those losses can substantially increase the efficiency of the system.

SUMMARY OF THE INVENTION

It is one feature of the present invention to provide a significant improvement in the efficiency of a thermodynamic cycle by heating a multicomponent liquid working stream with heat released by the partial condensation of an expanded spent stream.

In accordance with one embodiment of the present invention, a method for implementing a thermodynamic cycle includes the step of expanding a gaseous working stream, transforming its energy into usable form. That expansion produces a spent stream. The spent stream is then partially condensed to provide heat. A multicomponent oncoming liquid working stream is heated using the heat produced by the partial condensation of the spent stream and heat from an external heat source, until the multicomponent liquid working stream is evaporated. The evaporation of the multicomponent liquid working stream produces the gaseous working stream.

In a preferred embodiment of the present invention, the difference in the pressure of the multicomponent oncoming liquid working stream and the spent stream ensures that the multicomponent oncoming liquid working stream will begin to evaporate at a temperature that is lower than the temperature at which the spent stream begins to condense. To create such a multicomponent liquid working stream, the working fluid used in the process of the present invention may be a mixture comprising a high-boiling component and a low-boiling component, which begins to boil at a temperature that is lower than the temperature at which the high-boiling component begins to boil. In a particularly preferred embodiment of the present invention, the multicomponent oncoming liquid working stream includes about 55% to about 95% of the low-boiling component.

Such a mixture is preferred because such a mixture boils at variable temperatures so that the temperature at which boiling begins at any given pressure (the bubbling point) is lower than the temperature at which evaporation is completed (the dew point). Conversely, if such a mixture is condensed, the temperature at which condensation starts is higher than the temperature at which condensation ends. The difference between the dew point temperature and the bubbling point temperature depends on the properties of the components comprising the mixture and the composition of the mixture itself.

The mixture employed as a working fluid preferably has an initial boiling temperature at high pressure (the boiler pressure) that is significantly lower than the initial temperature of condensation at low pressure (the condenser pressure). Under appropriate temperatures and pressures, such a feature may allow use of part of the heat rejected during the initial condensation of the spent stream to cause the initial evaporation of the multicomponent oncoming liquid working stream. Such a feature may allow use of that heat to preheat the working fluid as well.

However, if the pressure of the multicomponent oncoming liquid working stream is significantly higher than the pressure of the spent stream, heat transferred from the spent stream, as the spent stream begins to condense, to the multicomponent oncoming liquid working stream may be insufficient to partially evaporate the multicomponent oncoming liquid working stream. In such an embodiment of the present invention, heat transferred from the partial condensation of the spent stream is used to preheat the multicomponent oncoming liquid working stream, without partially evaporating the multicomponent oncoming liquid working stream.

Although any conventional heat source may, in general, be used in conjunction with the system of the present invention, the system is particularly useful for the conversion of geothermal energy into electric power. As will be apparent from the following description of preferred embodiments, the system of the present invention may enable heat extracted from geothermal brine to be used for relatively high temperature purposes only, which may increase the thermodynamic reversibility of the system and may result in an increased efficiency of a power cycle that uses such a heat source.

DESCRIPTION OF PREFERRED EMBODIMENTS

Figure 1:
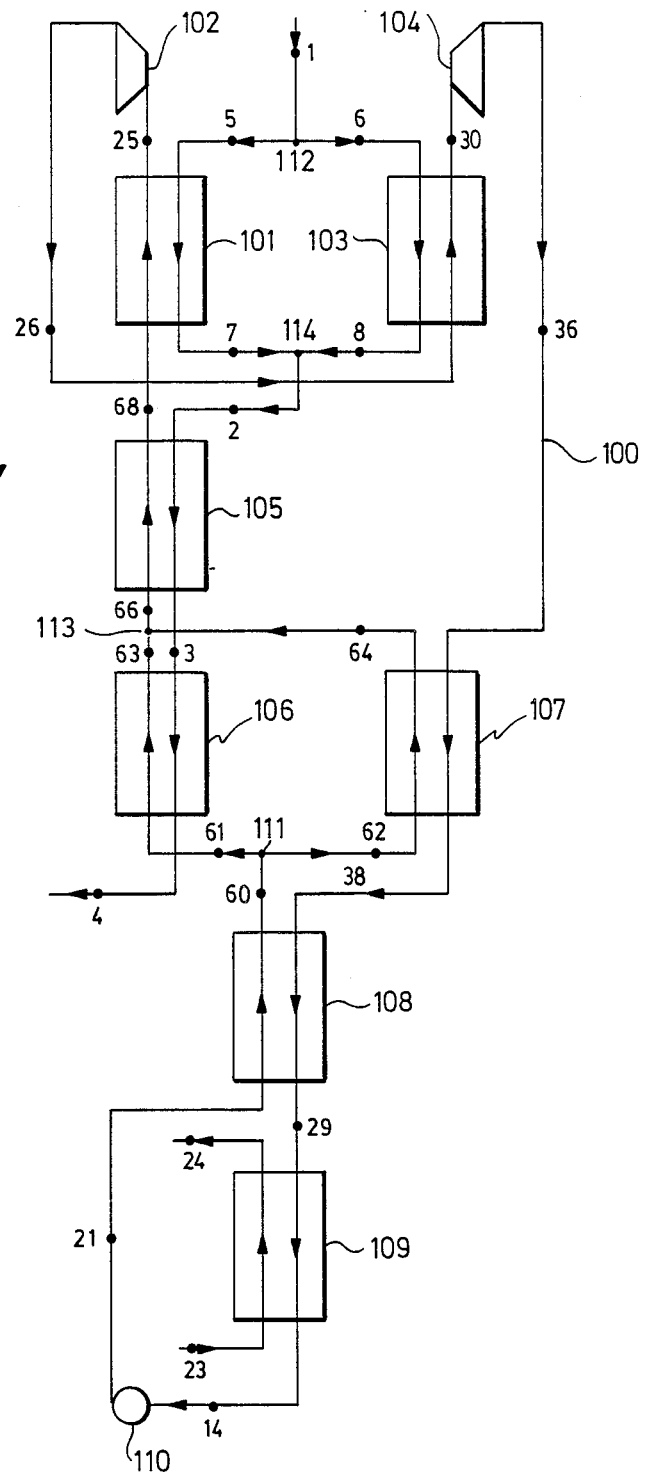
FIG. 1 is a schematic representation of one embodiment of the method and apparatus of the present invention.

The schematic shown in FIG. 1 shows an embodiment of preferred apparatus that may be used in the above described cycle. Specifically, FIG. 1 shows a system 100 that includes a boiler in the form of heat exchangers 105, 106, and 107, a preheater in the form of heat exchanger 108, and a superheater in the form of heat exchanger 101. In addition, the system 100 includes turbines 102 and 104, reheater 103, pump 110, and condenser 109. Further, the system 100 includes stream separators 111 and 112 and stream mixers 113 and 114.

The condenser 109 may be any type of known heat rejection device. For example, the condenser 109 may take the form of a heat exchanger, such as a water cooled system, or another type of condensing device.

Various types of heat sources may be used to drive the cycle of this invention. In the embodiment shown in FIG. 1, the heat source is a stream of geothermal fluid that flows from point 1 to point 4 through heat exchangers 101, 103, 105, and 106.

The working stream used in the system 100 preferably is a multicomponent working stream that comprises a lower boiling point fluid—the low-boiling component—and a higher boiling point fluid—the high-boiling component. Such a preferred working stream may be an ammonia-water mixture, two or more hydrocarbons, two or more freons, mixtures of hydrocarbons and freons, or the like. In general, the stream may be mixtures of any number of compounds with favorable thermodynamic characteristics and solubility. In a particularly preferred embodiment, a mixture of water and ammonia is used. The multicomponent working stream preferably includes about 55% to about 95% of the low-boiling component.

As shown in FIG. 1, a working stream circulates through system 100. The working stream includes a gaseous working stream that flows from heat exchanger 105 to turbine 102. The working stream also includes a spent stream, which flows from turbine 102 to condenser 109, and a liquid working stream, which flows from condenser 109 to heat exchanger 105.

In the cycle of the present invention, the liquid working stream, which has been completely condensed and which has a temperature that preferably is close to ambient temperature—with parameters as at point 14—is pumped by pump 110 to a selected high pressure, obtaining parameters as at point 21. Thereafter, that stream passes through recuperative preheater 108, where it is preheated by a returning spent stream, obtaining parameters as at point 60. The liquid working stream at point 60 preferably has parameters corresponding to those at or near its boiling point, i.e., it preferably is in the state of a saturated liquid or a slightly subcooled liquid.

The liquid working stream is then split at stream separator 111 into two substreams, having parameters as at points 61 and 62, respectively. Those two substreams form first and second parts of the liquid working stream. The substream flowing by point 61, i.e., the first part of the liquid working stream, passes through exchanger 106 where it boils, being heated—in this embodiment of the invention—by a stream of geofluid flowing from point 1 to point 4. That substream exits heat exchanger 106, having parameters as at point 63.

The other substream, flowing by point 62, i.e., the second part of the liquid working stream, passes through recuperative heat exchanger 107 where it is heated by a returning spent stream. That substream is preferably partially evaporated producing a stream having parameters as at point 64. In a particularly preferred embodiment, the parameters for the partially evaporated working fluid at points 63 and 64 are nearly identical.

The substreams passing by points 63 and 64 (which are first and second parts of a heated liquid working stream) are recombined at stream mixer 113 into one stream, i.e., a heated liquid working stream, obtaining parameters as at point 66. The heated liquid working stream, which in this embodiment of the present invention has been partially evaporated with parameters as at point 66, passes through heat exchanger 105 where it is heated—in this embodiment—by a stream of geofluid. In a particularly preferred embodiment, the partially evaporated working fluid is completely evaporated as it passes through heat exchanger 105. The partially evaporated working fluid entering heat exchanger 105, however, need not be completely evaporated at that step of the cycle. In either event, the working fluid exits heat exchanger 105 with parameters as at point 68.

The working stream, at point 68, is preferably in a state of a saturated vapor. However, it can be in a state of an incompletely evaporated mixture or a superheated vapor as well. In the particularly preferred embodiment set forth herein, that working fluid stream is a gaseous working fluid stream, having parameters as at point 68 (as shown in Table I). That stream passes through heat exchanger 101 where it is superheated by a stream of geofluid to form a superheated gaseous working stream with parameters as at point 25. The stream with parameters as at point 25 is sent into the high pressure turbine 102 where it expands, producing power, and obtaining parameters as at point 26.

In the embodiment shown in FIG. 1, the spent stream, with parameters as at point 26, is then sent into reheater 103 where it is reheated by a stream of geofluid, obtaining parameters as at point 30. The spent stream is then sent to the low pressure turbine 104 where it is finally expanded, producing power, and obtaining parameters as at point 36.

In a particularly preferred embodiment of the system of the present invention, the parameters of the spent stream at point 36 correspond to those of a stream that is in the state of a saturated vapor. The pressure, at point 36, may be conveniently selected to ensure the complete condensation of the spent stream, as it passes through condenser 109, at the available temperature of the cooling medium flowing through condenser 109 from point 23 to point 24, which is preferably water or air.

The spent stream passes from point 36 through heat exchanger 107 where it partially condenses, providing heat for the initial evaporation of the liquid working stream passing from point 62 to point 64, i.e., the second part of the liquid working stream. After the partially condensed spent stream exits from heat exchanger 107, it obtains parameters as at point 38. The partially condensed spent stream then passes through recuperative preheater 108 where it further condenses, providing heat for preheating the oncoming liquid working stream. The partially condensed spent stream exits recuperative preheater 108 with parameters as at point 29. The partially condensed spent stream then enters condenser 109 where it is cooled by water or air flowing from point 23 to point 24. The above described liquid working stream, having parameters as at point 14, exits from condenser 109 completing the cycle.

In the embodiment of the present invention shown in FIG. 1, the external heat source for completing the evaporation of the liquid working stream is a stream of geofluid, having initial parameters as at point 1. That stream is split at stream separator 112, into two substreams, having parameters as at points 5 and 6, respectively. The substreams passing by points 5 and 6 pass through heat exchangers 101 and 103, respectively, providing heat for superheating the above described gaseous working stream and for reheating the spent stream. The substream passing by point 5 exits heat exchanger 101 with parameters as at point 7, and the substream passing by point 6 exits heat exchanger 103 with parameters as at point 8.

Thereafter, the substreams of geofluid are combined at stream mixer 114 into one stream having parameters as at point 2. That stream of geofluid passes through heat exchanger (boiler) 105 where it is cooled, providing heat for the complete evaporation of the partially evaporated, i.e., heated, liquid working stream The geofluid stream exits heat exchanger 105 with parameters as at point 3. The stream of geofluid then passes through heat exchanger 106 where it is cooled, providing heat for the initial evaporation of a first part of the liquid working stream (a second part of the liquid working stream is initially evaporated by recuperation of heat from the returning spent stream, as described above). The stream of geofluid exits heat exchanger 106 with parameters as at point 4, after which it may be pumped into the geofluid strata.

As is apparent from the above description, a unique feature of the above described embodiment of the present invention is that the initial temperature of condensation of the returning spent stream (the stream passing by point 36) is higher than the initial boiling temperature of the second part of the oncoming liquid working stream (the stream passing by point 62).

The relationship between the initial condensation temperature of the returning spent stream and the initial boiling temperature of the liquid working stream of that embodiment enables the partial evaporation of the liquid working stream via recuperation of heat from the returning spent stream. That feature should enable the power system and cycle of the above described embodiment of the present invention to provide a significant increase in efficiency, when compared with the presently available organic and supercritical organic Rankine cycles.

It will be apparent to those skilled in the art that the pressure of the oncoming liquid working stream, at point 62, may be so high that the partial condensation of the returning spent stream will heat that portion of the liquid working stream, but will not cause that stream to begin to evaporate. However, an embodiment of the present invention in which the difference in pressure between the liquid working stream and the returning spent stream enables heat from the partial condensation of the spent stream to partially evaporate the liquid working stream is preferred over an embodiment in which the pressure of the oncoming liquid working stream, at point 62, is so high as to inhibit partial evaporation of that stream, despite the transfer of heat produced by the partial condensation of the returning spent stream.

Preferred parameters for the points corresponding to the points set forth in FIG. 1 are presented in Table I for a system having a water-ammonia working fluid stream which includes 83.05 wt. % of ammonia. All calculations used to generate the parameters of Table I were performed for what appear to be the same border conditions and the same limitations as have been used in the above referenced Heber geothermal plant A comparison in performance of the Heber geothermal power plant and the potential performance of the system of the present invention, using what appear to be the same border conditions, is included in Table II.

TABLE I

| Point | P[psia] | X | T °F. | H [Btu/lb] | G |
|---|---|---|---|---|---|
| 1 | — | BRINE | 367.00 | — | 2.6269 |
| 2 | — | BRINE | 333.96 | — | 2.6269 |
| 3 | — | BRINE | 222.26 | — | 2.6269 |
| 4 | — | BRINE | 170.22 | — | 2.6269 |
| 5 | — | BRINE | 367.00 | — | .9851 |
| 6 | — | BRINE | 367.00 | — | 1.6418 |
| 7 | — | BRINE | 333.96 | — | .9851 |
| 8 | — | BRINE | 333.96 | — | 1.6418 |
| 14 | 89.30 | 0.8305 | 60.00 | −20.33 | 1.0000 |
| 21 | 432.44 | 0.8305 | 60.00 | −18.78 | 1.0000 |
| 23 | — | WATER | 53.00 | — | 16.8761 |
| 24 | — | WATER | 78.07 | — | 16.8761 |
| 25 | 402.44 | 0.8305 | 352.00 | 776.80 | 1.0000 |
| 26 | 232.20 | 0.8305 | 273.78 | 736.73 | 1.0000 |
| 29 | 89.60 | 0.8305 | 121.93 | 402.82 | 1.0000 |
| 30 | 227.20 | 0.8305 | 352.00 | 792.06 | 1.0000 |
| 36 | 90.90 | 0.8305 | 222.26 | 726.46 | 1.0000 |
| 38 | 89.90 | 0.8305 | 170.00 | 519.86 | 1.0000 |
| 60 | 422.44 | 0.8305 | 165.00 | 98.25 | 1.0000 |
| 61 | 422.44 | 0.8305 | 165.00 | 98.25 | .4029 |
| 62 | 422.44 | 0.8305 | 165.00 | 98.25 | .5971 |
| 63 | 412.44 | 0.8305 | 217.26 | 444.29 | .4029 |
| 64 | 412.44 | 0.8305 | 217.26 | 444.29 | .5971 |
| 66 | 412.44 | 0.8305 | 217.26 | 444.29 | 1.0000 |
| 68 | 407.44 | 0.8305 | 307.75 | 743.60 | 1.0000 |

TABLE II

| Power Output | MW | Thermal Efficiency | Second Law Efficiency |
|---|---|---|---|
| Heber Plant | 59.2 | 13.2 | 48.62 |
| Proposed System | 80.785 | 18.04 | 66.44 |

The results shown in Table II suggest that the system of the present invention could potentially increase the power output from the same geothermal source by a factor of about 1.37. Such an enhanced power output could significantly reduce the overall cost of a geothermal power plant.

When a geothermal power plant is operating, and a significant portion of its power output must be spent to circulate geothermal brine, the power needed to circulate the geothermal brine generally remains constant, irrespective of the efficiency of the power plant. For the Heber power plant, this power is apparently equal to about 12MW. The net output of the Heber power plant is, therefore, apparently equal to about 47.2MW. In contrast, the net output of the proposed system of the present invention could be equal to about 68.785MW. As a result, the net efficiency of the proposed system potentially could be about 1.46 times higher than the net efficiency of the Heber geothermal plant.

Because the cost to provide geothermal brine for a power plant is apparently identical for either the Heber plant system or the system of the present invention, the proposed system could potentially provide for a significantly lower cost for the geofluid supplied to the cycle per 1 kW of net output.

Figure 2:
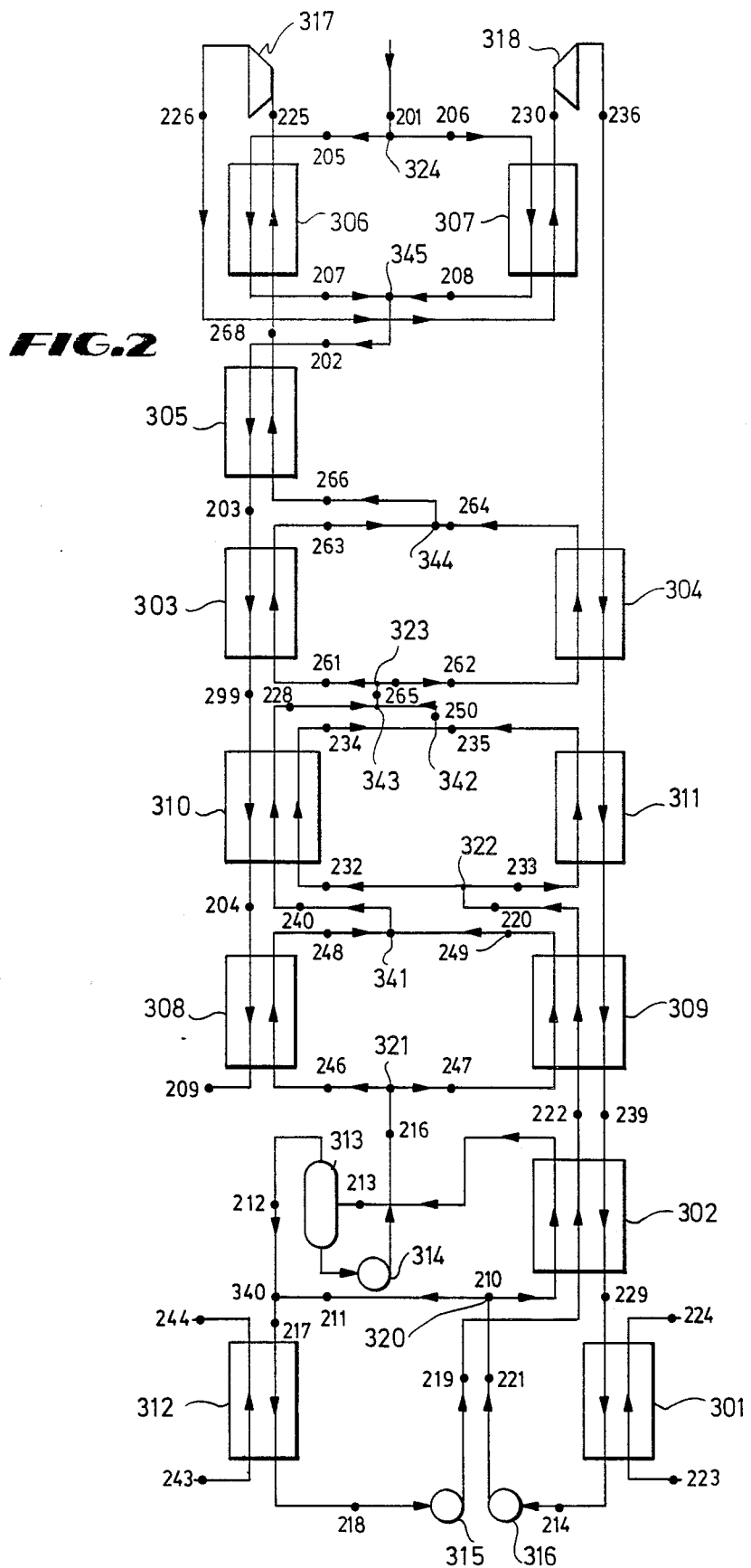
FIG. 2 is a schematic representation of a second embodiment of the method and apparatus of the present invention.

In the system of FIG. 1, the composition of the working fluid flowing through the cycle remains constant An increased efficiency for the cycle may be obtained, however, if the composition of the working fluid is varied at different parts of the cycle. FIG. 2 provides such an embodiment of the present invention in which the liquid working stream is split into working streams having different compositions before the oncoming liquid working stream is completely evaporated to produce the gaseous working stream.

In accordance with the embodiment of FIG. 2 of the present invention, a method for implementing a thermodynamic cycle includes the step of expanding a gaseous working stream, transforming its energy into usable form (as in the FIG. 1 embodiment). That expansion produces a spent stream that is partially condensed to provide heat to heat an oncoming liquid working stream (as in the FIG. 1 embodiment).

However, the oncoming liquid working stream of the FIG. 2 embodiment is generated in a different manner from the FIG. 1 embodiment. In the FIG. 2 embodiment, the spent stream is condensed to produce a first liquid working stream. The first liquid working stream is divided into enriched and lean substreams through the following steps Initially, the first liquid working stream is separated into first and second liquid substreams. The first liquid substream is heated to form a partially evaporated liquid substream that is separated to form a vapor stream and a liquid stream. The vapor stream is combined with the second liquid substream to form the enriched substream. The enriched substream is enriched with a higher percentage of a lower boiling component than is contained in the first liquid working stream. The liquid stream comprises the lean substream, which includes a lower percentage of a low boiling component than is contained in the first liquid working stream.

The enriched substream is condensed and then heated by the returning spent stream, until it is preferably partially evaporated. The lean substream is combined with the preferably partially evaporated enriched substream to form the oncoming liquid working stream that is heated (preferably partially evaporated) by the returning spent stream and then completely evaporated by an external heat source, such as a geothermal heat source, to form the gaseous working stream.

In the embodiment shown in FIG. 2, the completely condensed first liquid working stream (having a temperature which is close to the initial temperature of the cooling source (e.g., cooling water) flowing from point 223 to point 224 of FIG. 2) with parameters as at point 214 is pumped to an intermediate pressure by pump 316 to obtain parameters as at point 221. The first liquid working stream is divided at stream separator 320 into first and second liquid substreams having parameters as at points 210 and 211, respectively. The first liquid substream is sent into recuperative heat exchanger 302, where it is heated to form a partially evaporated liquid substream with parameters as at point 213.

The partially evaporated liquid substream is then sent into separator 313 (which may be a flash tank), where it is separated into a vapor stream, with parameters as at point 212, and a liquid stream, with parameters as at point 215. The vapor stream is then combined with the second liquid substream at stream mixer 340 to form an enriched substream, with parameters as at point 217. That enriched substream is then sent into condenser 312, where it is completely condensed by a stream of cooling water, flowing from point 243 to point 244, to obtain parameters as at point 218. The enriched substream is then pumped to an increased pressure by pump 315, obtaining parameters as at point 219. Thereafter, the enriched substream is sent parallel with the first liquid substream, flowing from point 210 to point 213, into heat exchanger 302, where the enriched substream is heated, obtaining parameters as at point 222.

Meanwhile, the liquid stream, which comprises the lean substream, has been pumped to an increased pressure by pump 314 to obtain parameters as at point 216. The temperatures of the streams flowing past points 216 and 222 preferably are approximately equal.

The preceding process steps yield an enriched substream, flowing by point 222, that is enriched with a higher percentage of a lower boiling component than is contained in the first liquid working stream, and a lean substream, flowing by point 216, that includes a lower percentage of a lower boiling component than is contained in the first liquid working stream.

The enriched and lean substreams are sent into heat exchangers 309 and 308. The lean substream is separated at stream separator 321 into first and second lean substreams, having parameters as at points 246 and 247, respectively, before the first lean substream enters heat exchanger 308 and the second lean substream enters heat exchanger 309. The enriched substream enters heat exchanger 309 only.

In the embodiment shown in FIG. 2, heat exchanger 309 is a recuperative heat exchanger, in which the returning spent stream exchanges heat with the second lean substream and the enriched substream. In heat exchanger 308, heat is transferred to the first lean substream from a stream of geofluid passing from point 204 to point 209. (Mineralization may not allow cooling of geothermal brine to a sufficiently low temperature to warrant use of heat exchanger 308. Under those circumstances, heat exchanger 308 preferably should be removed from the system, and both the enriched and lean substreams sent into heat exchanger 309 only.)

The preheated enriched substream exits heat exchanger 309 with parameters as at point 220, which preferably correspond to those of a liquid stream in a state of a saturated liquid. The first and second lean substreams exit heat exchangers 308 and 309, obtaining parameters as at points 248 and 249, respectively. Those substreams are combined at stream mixer 341 to reconstitute the lean substream, which has become a preheated lean substream with parameters as at point 240 (those parameters preferably correspond to those of a liquid stream in the state of a subcooled liquid). The temperatures of the streams flowing past points 220 and 240 are preferably about equal.

The preheated enriched substream is separated into first and second enriched substreams, having parameters as at points 232 and 233, respectively, at stream separator 322. The first enriched substream is sent into heat exchanger 310, along with the reconstituted and preheated lean substream. While passing through heat exchanger 310, the first enriched substream and the preheated lean substream are heated with heat transferred from a stream of geofluid passing from point 299 to point 204.

The second enriched substream is sent into heat exchanger 311, where it is heated by heat released from the returning spent stream.

The first and second enriched substreams preferably begin to boil as they pass through heat exchangers 310 and 311 to form first and second parts of a partially evaporated enriched substream with parameters as at points 234 and 235, respectively. Those substreams are combined at stream mixer 342 to reconstitute the enriched substream, which has become a partially evaporated enriched substream, with parameters as at point 250 (those parameters preferably correspond to those of a stream in a bi-phase state). The preheated lean substream exits from heat exchanger 310 as a heated lean substream with parameters as at point 228, which preferably correspond to those of a saturated liquid. The temperatures and pressures of the streams flowing past points 250 and 228 are preferably approximately equal The partially evaporated enriched substream and the heated lean substream are combined at stream mixer 343 to form a partially evaporated oncoming liquid working stream (corresponding, in essence, to the oncoming liquid working stream flowing by point 60 in the FIG. 1 embodiment of the present invention) with parameters as at point 265, corresponding to those of a stream in a bi-phase state As in the FIG. 1 embodiment of the present invention, the oncoming liquid working stream (in a bi-phase state in the FIG. 2 embodiment in contrast to the single phase state in the FIG. 1 embodiment) is then split at stream separator 323 into two substreams, which comprise first and second parts of the partially evaporated oncoming liquid working stream, having parameters as at points 261 and 262, respectively. The substream flowing by point 261 passes through exchanger 303 where it further boils, being heated—in this embodiment of the invention—by a stream of geofluid flowing from point 203 to point 299. That substream exits heat exchanger 303 as a first part of a further evaporated working stream, having parameters as at point 263.

The other substream, flowing by point 262, passes through recuperative heat exchanger 304 where it is heated by the returning spent stream. That substream also further boils producing a second part of a further evaporated working stream, having parameters as at point 264. In a particularly preferred embodiment, the parameters for the further evaporated working fluid at points 263 and 264 are nearly identical.

The substreams passing by points 263 and 264 are recombined at stream mixer 344 into one stream, a further evaporated working stream with parameters as at point 266. The further evaporated working stream, with parameters as at point 266, passes through heat exchanger 305 where it is heated—in this embodiment—by a stream of geofluid flowing from point 202 to point 203 In a particularly preferred embodiment, the further evaporated working fluid is completely evaporated as it passes through heat exchanger 305, obtaining parameters as at point 268, which preferably correspond to a gaseous working stream in a state of a saturated vapor. That stream passes through heat exchanger 306 where it is superheated by a stream of geofluid flowing from point 205 to point 207, forming a superheated gaseous working stream with parameters as at point 225. The superheated gaseous working stream with parameters as at point 225 is sent into the high pressure turbine 317 where it expands to an intermediate pressure, producing work, and obtaining parameters as at point 226.

Like the embodiment shown in FIG. 1, the spent stream, with parameters as at point 226, is then sent into reheater 307 where it is reheated by a stream of geofluid flowing from point 206 to point 208, obtaining parameters as at point 230. The spent stream is then sent to the low pressure turbine 318 where it is further expanded, producing work, and obtaining parameters as at point 236. In a particularly preferred embodiment, the parameters of the spent stream at point 236 correspond to those of a stream that is in the state of a saturated vapor.

The spent stream passes from point 236 through heat exchanger 304 where it partially condenses, providing heat for the further evaporation of the second part of the partially evaporated liquid working stream passing from point 262 to point 264. After the partially condensed spent stream exits from heat exchanger 304, it obtains parameters as at point 237. The partially condensed spent stream then passes through recuperative heat exchangers 311, 309, and 302, obtaining parameters as at points 238, 239, and 229, respectively. While passing through those heat exchangers, the spent stream further condenses, providing heat for partially evaporating the second enriched substream, preheating the enriched substream and the second lean substream, and partially evaporating the first liquid substream.

The partially condensed spent stream then enters condenser 301, where it is cooled by water or air flowing from point 223 to point 224, to produce the above described first liquid working stream, having parameters as at point 214, completing the cycle of FIG. 2.

Like the embodiment of FIG. 1, the external heat source for the FIG. 2 embodiment of the present invention for completing the evaporation of the liquid working stream is a stream of geofluid, having initial parameters as at point 201. That stream is split at stream separator 324 into two substreams, having parameters as at points 205 and 206, respectively. The substreams passing by points 205 and 206 pass through heat exchangers 306 and 307, respectively, providing heat for superheating the above described gaseous working stream and for reheating the spent stream. The substream passing by point 205 exits heat exchanger 306 with parameters as at point 207, and the substream passing by point 206 exits heat exchanger 307 with parameters as at point 208.

Thereafter, the substreams of geofluid are combined at stream mixer 345 into one stream having parameters as at point 202. That stream of geofluid passes through heat exchanger (boiler) 305 where it is cooled, providing heat for the complete evaporation of the further evaporated working stream. The geofluid stream exits heat exchanger 305 with parameters as at point 203. The stream of geofluid then passes through heat exchangers 303 and 310, where it is cooled, providing heat for the further evaporation of a first part of the partially evaporated liquid working stream, the initial evaporation of the first enriched substream, and the preheating of the lean substream. The stream of geofluid exits heat exchangers 303 and 310 with parameters as at points 299 and 204, respectively.

If not inhibited by mineralization of the brine, the stream of geofluid may be sent through heat exchanger 308 to preheat the first lean substream, where it is further cooled yielding a stream with parameters as at point 209. The stream of geofluid may be reinjected into the geostrata after exiting from heat exchanger 308.

Figure 3:
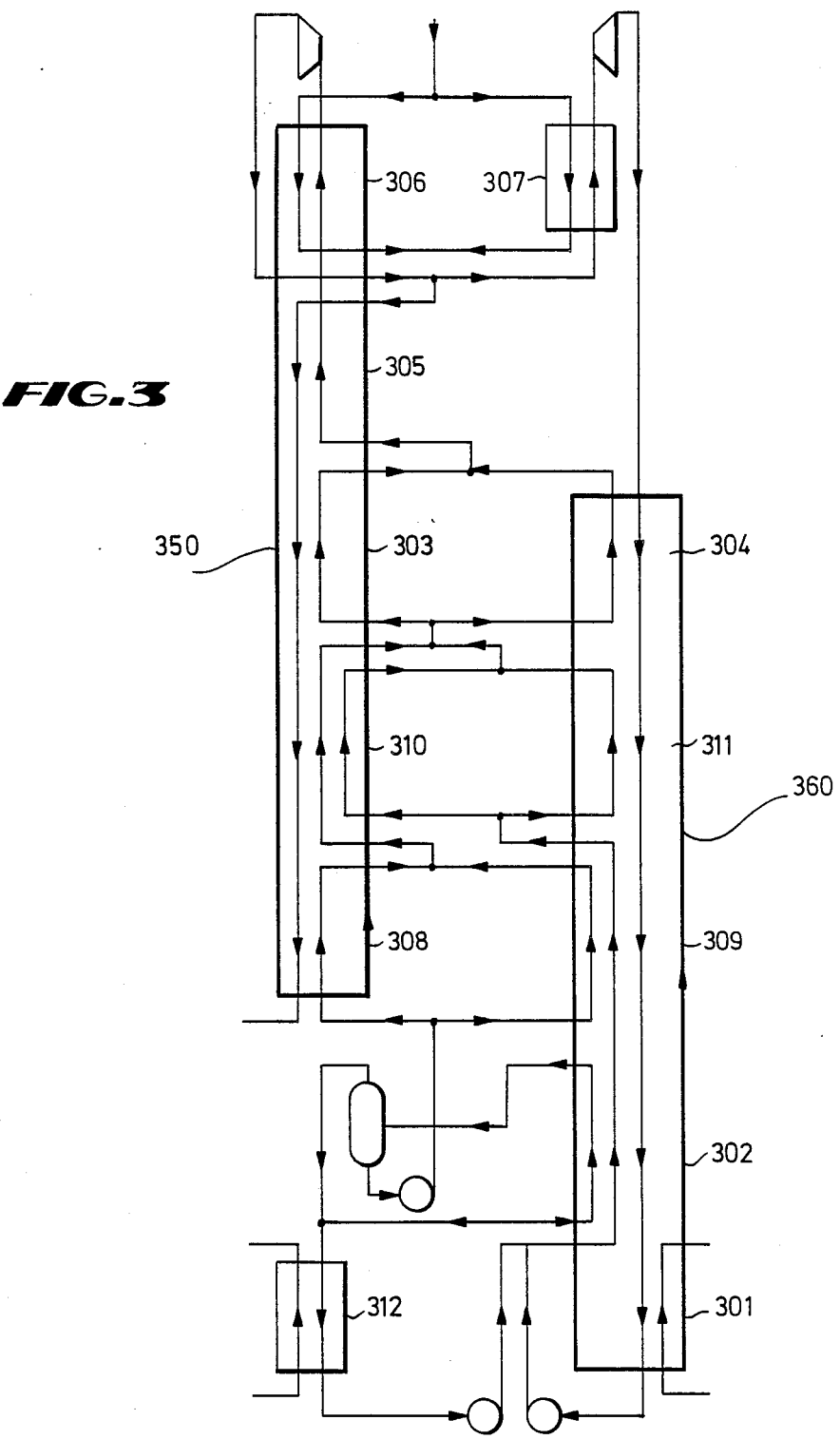
FIG. 3 is a schematic representation of the embodiment of FIG. 2 in which four heat exchangers have replaced the twelve heat exchangers of the FIG. 2 embodiment.

The several heat exchangers shown in FIG. 2 represent, in essence, calculation zones. Although real apparatuses may be used as shown in FIG. 2, that system may alternatively comprise only four actual heat exchangers, i.e., heat exchangers 312 and 307, and a single heat exchanger in place of heat exchangers 306, 305, 303, 310, and 308, and a single heat exchanger in place of heat exchangers 304, 311, 309, 302, and 301. Such a system is shown in FIG. 3, in which heat exchanger 350 is used in place of heat exchangers 306, 305, 303, 310, and 308, and heat exchanger 360 is used in place of heat exchangers 304, 311, 309, 302, and 301.

The FIG. 2 embodiment of the present invention offers some potential advantages over the FIG. 1 embodiment. One advantage is that by splitting the liquid working stream, exiting from the condenser 301, into lean and enriched substreams, the overall pressure at which the liquid working stream boils may be increased from what it would have been if the liquid working stream was not split. (For the same temperature, the enriched substream would begin to boil at a higher pressure than the liquid working stream would begin to boil.) Such an increased overall boiling pressure should reduce exergy losses in the process of transferring heat from the geofluid, or other external heat source, to the cycle's working stream.

The increased overall boiling pressure also should increase the efficiency of the cycle and the power output per unit of heat input, or per unit of geofluid flow in the embodiment of the present invention employing a geofluid as the external heat source.

Another advantage of the FIG. 2 embodiment of the present invention, over the FIG. 1 embodiment, is that the FIG. 2 embodiment should permit a greater degree of flexibility, especially when a geofluid is used as the external heat source The FIG. 2 embodiment allows for adjustment of the system to a wide variety of border conditions, sustaining high thermodynamic efficiency.

Parameters for the points corresponding to the points set forth in FIG. 2 are presented in Table III for a system having a water-ammonia working fluid stream. All calculations used to generate the parameters of Table III were performed for the same border conditions used for calculating the parameters of Table I.

The thermal efficiency and power output per 1000 lbs. of geofluid of the FIG. 2 embodiment, using the parameters shown in Table III, should be significantly greater than those for the FIG. 1 embodiment, using the parameters shown in Table I.

TABLE III

| Point | P[psia] | X | T °F. | H [Btu/lb] | G |
|---|---|---|---|---|---|
| 201 | — | BRINE | 367.00 | — | 2.7084 |
| 202 | — | BRINE | 329.94 | — | 2.7084 |
| 203 | — | BRINE | 218.22 | — | 2.7084 |
| 204 | — | BRINE | 170.00 | — | 2.7084 |
| 205 | — | BRINE | 367.00 | — | .8599 |
| 206 | — | BRINE | 367.00 | — | 1.8485 |
| 207 | — | BRINE | 329.94 | — | .8599 |
| 208 | — | BRINE | 329.94 | — | 1.8485 |
| 209 | — | BRINE | 170.00 | — | 2.7084 |
| 210 | 131.89 | 0.8540 | 60.00 | −13.72 | .9618 |
| 211 | 131.89 | 0.8540 | 60.00 | −13.72 | .0382 |
| 212 | 128.39 | 0.9998 | 87.45 | 556.66 | .3386 |
| 213 | 128.39 | 0.8540 | 87.45 | 193.01 | .9618 |
| 214 | 93.08 | 0.8540 | 60.00 | −13.89 | 1.0000 |
| 215 | 128.39 | 0.7748 | 87.45 | −4.54 | .6232 |
| 216 | 521.61 | 0.7748 | 87.45 | −2.83 | .6232 |
| 217 | 128.39 | 0.9850 | 80.39 | 498.86 | .3768 |
| 218 | 127.89 | 0.9850 | 70.00 | 37.51 | .3768 |
| 219 | 526.61 | 0.9850 | 70.00 | 39.50 | .3768 |
| 220 | 516.61 | 0.9850 | 165.00 | 151.23 | .3768 |
| 221 | 131.89 | 0.8540 | 60.00 | −13.72 | 1.0000 |
| 222 | 521.61 | 0.9850 | 87.45 | 59.17 | .3768 |
| 223 | — | WATER | 53.00 | — | 19.4131 |
| 224 | — | WATER | 68.98 | — | 19.4131 |
| 225 | 496.61 | 0.8540 | 352.00 | 758.06 | 1.0000 |
| 226 | 250.54 | 0.8540 | 266.99 | 709.66 | 1.0000 |
| 228 | 511.61 | 0.7748 | 187.22 | 109.69 | .6232 |
| 229 | 93.38 | 0.8540 | 82.28 | 296.28 | 1.0000 |
| 230 | 245.54 | 0.8540 | 352.00 | 779.54 | 1.0000 |
| 232 | 516.61 | 0.9850 | 165.00 | 151.23 | .1145 |
| 233 | 516.61 | 0.9850 | 165.00 | 151.23 | .2622 |
| 234 | 511.61 | 0.9850 | 187.22 | 545.75 | .1145 |
| 235 | 511.61 | 0.9850 | 187.22 | 545.75 | .2622 |
| 236 | 94.68 | 0.8540 | 218.22 | 711.77 | 1.0000 |
| 237 | 94.08 | 0.8540 | 202.88 | 640.65 | 1.0000 |
| 238 | 93.68 | 0.8540 | 170.00 | 537.20 | 1.0000 |
| 239 | 93.53 | 0.8540 | 155.98 | 502.52 | 1.0000 |
| 240 | 516.61 | 0.7748 | 165.00 | 83.84 | .6232 |
| 243 | — | WATER | 53.00 | — | 26.7031 |
| 244 | — | WATER | 70.28 | — | 26.7031 |
| 250 | 511.61 | 0.9850 | 187.22 | 545.75 | .3768 |
| 261 | 511.61 | 0.8540 | 187.22 | 273.98 | .5025 |
| 262 | 511.61 | 0.8540 | 187.22 | 273.98 | .4975 |
| 263 | 506.61 | 0.8540 | 213.22 | 416.92 | .5025 |
| 264 | 506.61 | 0.8540 | 213.22 | 416.92 | .4975 |
| 265 | 511.61 | 0.8540 | 187.22 | 273.98 | 1.0000 |
| 266 | 506.61 | 0.8540 | 213.22 | 416.92 | 1.0000 |
| 268 | 501.61 | 0.8540 | 310.99 | 725.55 | 1.0000 |
| 299 | — | BRINE | 192.22 | — | 2.7084 |

While the present invention has been described with respect to a number of preferred embodiments, which utilize a single preferred external heat source, those skilled in the art will appreciate a number of variations and modifications of those embodiments. For example, a different external heat source may be used, the number of heat exchangers may be increased or decreased, the number of pumps, turbines, condensing devices, separators, etc., may be varied, as well as the number and composition of streams flowing through the cycle. Thus, it is intended that the appended claims cover all such variations and modifications as fall within the true spirit and scope of the present invention.

What is claimed is:

1. A method for implementing a thermodynamic cycle comprising the steps of:

expanding a gaseous working stream, transforming its energy into usable form and producing a spent stream;

reheating and expanding the spent stream, to transform its energy into usable form;

heating a multicomponent oncoming liquid working stream by partially condensing the spent stream to preheat and partially evaporate the multicomponent oncoming liquid working stream to produce a heated liquid working stream; and evaporating the heated liquid working stream using heat produced by an external heat source, to form the gaseous working stream.

2. The method of claim 1 wherein heat from the external heat source is used to completely evaporate the heated liquid working stream.

3. The method of claim 2 wherein the external heat source is a fluid stream that exchanges heat with the spent stream to reheat the spent stream prior to expansion of the spent stream, and that exchanges heat with the gaseous working stream to superheat the gaseous working stream, and that exchanges heat with the heated liquid working stream to completely evaporate the heated liquid working stream to form the gaseous working stream, and that exchanges heat with a first part of the multicomponent oncoming liquid working stream to partially evaporate the oncoming liquid working stream to form a first part of the heated liquid working stream.

4. The method of claim 3 wherein the external heat source is a geothermal fluid stream produced by a geothermal source.

5. The method of claim 1 further comprising the steps of:

condensing completely the spent stream, after the spent stream was partially condensed to provide heat to heat the multicomponent oncoming liquid working stream, to form a first liquid working stream;

dividing the first liquid working stream into an enriched substream, that is enriched with a higher percentage of a lower boiling component than is contained in the first liquid working stream, and a lean substream, that includes a lower percentage of a low boiling component than is contained in the first liquid working stream;

heating the enriched substream with heat transferred from the spent stream, after the spent stream has been partially condensed to heat the multicomponent oncoming liquid working stream and before the spent stream has been completely condensed to form the first liquid working stream; and combining the enriched substream with the lean substream to form the multicomponent oncoming liquid working stream.

6. The method of claim 5 further comprising the steps of:

dividing the first liquid working stream into first and second liquid substreams;

heating the first liquid substream to form a partially evaporated liquid substream;

separating the partially evaporated liquid substream to form a vapor stream and a liquid stream, the liquid stream comprising the lean substream; and combining the vapor stream with the second liquid substream to form the enriched substream.

7. The method of claim 6 further comprising the steps of:

completely condensing the enriched substream and pumping the enriched substream to an increased pressure prior to heating the enriched substream with heat transferred from the spent stream; and pumping the lean substream to an increased pressure and heating the lean substream with heat transferred from an external heat source prior to combining the enriched substream with the lean substream to form the multicomponent oncoming liquid working stream.

8. The method of claim 7 further comprising the steps of:

separating the enriched substream into first and second enriched substreams;

heating the first enriched substream with heat transferred from an external heat source;

heating the second enriched substream with heat transferred from the spent stream;

separating the lean substream into first and second lean substreams;

heating the first lean substream with heat transferred from an external heat source;

heating the second lean substream with heat transferred from the spent stream; and combining the first and second enriched substreams to regenerate the enriched substream and combining the first and second lean substreams to regenerate the lean substream before the lean substream and the enriched substream are combined to form the multicomponent oncoming liquid working stream.

9. A method for implementing a thermodynamic cycle comprising the steps of:

expanding a superheated gaseous working stream, transforming its energy into usable form and producing a spent stream;

reheating and expanding the spent stream, to transform its energy into usable form;

heating a multicomponent oncoming liquid working stream, by partially condensing the spent stream, to produce a heated liquid working stream;

completely condensing the spent stream, after heat produced by partially condensing the spent stream has been used to heat the multicomponent oncoming liquid working stream, to produce the multicomponent oncoming liquid working stream;

evaporating the heated liquid working stream using heat produced by a geothermal external heat source to form a gaseous working stream; and superheating the gaseous working stream to form the superheated gaseous working stream.

10. The method of claim 9 further comprising the steps of:

pumping the multicomponent oncoming liquid working stream, formed by the complete condensation of the spent stream, to a higher pressure;

transferring heat from the geothermal external heat source to the spent stream to reheat the spent stream prior to expansion of the spent stream;

transferring heat from the geothermal external heat source to the gaseous working stream to superheat the gaseous working stream;

transferring heat from the geothermal external heat source to a first part of the multicomponent oncoming liquid working stream, after the multicomponent oncoming liquid working stream has been pumped to a higher pressure, to partially evaporate a first part of the multicomponent oncoming liquid working stream to form a first part of the heated liquid working stream;

partially condensing the spent stream to preheat and partially evaporate a second part of the multicomponent oncoming liquid working stream to produce a second part of the heated liquid working stream; and combining the first and second parts of the heated liquid working stream to form the heated liquid working stream.

11. The method of claim 10 wherein the gaseous working stream, the spent stream, the multicomponent oncoming liquid working stream, the heated liquid working stream, and the superheated gaseous working stream are each multicomponent working streams that comprise a low-boiling component and a high-boiling component.

12. A method for implementing a thermodynamic cycle comprising the steps of:

expanding a superheated gaseous working stream, transforming its energy into usable form and producing a spent stream;

reheating the spent stream with heat transferred from a geothermal external heat source;

expanding the spent stream to transform its energy into usable form;

further evaporating a second part of a partially evaporated multicomponent oncoming liquid working stream, by partially condensing the spent stream, to produce a second part of a further evaporated working stream;

partially evaporating a second enriched substream with heat transferred from the further condensation of the spent stream to form a second part of a partially evaporated enriched substream;

preheating an enriched substream and a lean substream with heat transferred from the further condensation of the spent stream to form a preheated enriched substream and a preheated lean substream;

partially evaporating a first liquid substream with heat transferred from the further condensation of the spent stream to form a partially evaporated liquid substream;

condensing completely the spent stream to form a first liquid working stream;

pumping the first liquid working stream to an increased pressure;

separating the first liquid working stream into the first liquid substream and a second liquid substream;

separating the partially evaporated liquid substream into a vapor stream and a liquid stream, after the first liquid substream has been partially evaporated with heat transferred from the further condensation of the spent stream to form the partially evaporated liquid substream, the liquid stream comprising the lean substream, the lean substream including a lower percentage of a low boiling component than is contained in the first liquid working stream;

combining the vapor stream with the second liquid substream to form the enriched substream, the enriched substream enriched with a higher percentage of a lower boiling component than is contained in the first liquid working stream;

completely condensing the enriched substream and pumping the enriched substream to an increased pressure prior to preheating the enriched substream with heat transferred from the further condensation of the spent stream to form the preheated enriched substream;

pumping the lean substream to an increased pressure prior to preheating the lean substream with heat transferred from the further condensation of the spent stream to form the preheated lean stream;

separating the preheated enriched substream into a first enriched substream and the second enriched substream prior to the second enriched substream being partially evaporated with heat transferred from the further condensation of the spent stream to form the second part of the partially evaporated enriched substream;

partially evaporating the first enriched substream with heat transferred from the geothermal external heat source to form a first part of the partially evaporated enriched substream;

heating the preheated lean substream with heat transferred from the geothermal external heat source to form a heated lean substream;

combining the first and second parts of the partially evaporated enriched substream to form the partially evaporated enriched substream;

combining the heated lean substream with the partially evaporated enriched substream to form the partially evaporated multicomponent oncoming liquid working stream;

separating the partially evaporated multicomponent oncoming liquid working stream into the second part of the partially evaporated multicomponent oncoming liquid working stream and a first part of the partially evaporated multicomponent oncoming liquid working stream prior to further evaporating the second part of the partially evaporated multicomponent oncoming liquid working stream, by partially condensing the spent stream, to produce the second part of the further evaporated working stream;

further evaporating the first part of the partially evaporated multicomponent oncoming liquid working stream with heat transferred from the geothermal external heat source to form a first part of the further evaporated working stream;

combining the first and second parts of the further evaporated working stream to form the further evaporated working stream;

completely evaporating the further evaporated working stream with heat produced by the geothermal external heat source to form a gaseous working stream; and superheating the gaseous working stream with heat produced by the geothermal external heat source to form the superheated gaseous working stream.

13. The method of claim 12 wherein each of the streams flowing through the cycle are multicomponent streams that comprise about 55% to about 95% of an ammonia low-boiling component and about 5% to about 45% of a water high-boiling component.

14. A method for implementing a thermodynamic cycle comprising the steps of:

expanding a gaseous working stream, transforming its energy into usable form and producing a spent stream;

partially condensing the spent stream to provide heat;

forming an oncoming liquid working stream that begins to evaporate at a temperature that is lower than the temperature at which the spent stream begins to condense; and evaporating the oncoming liquid working stream using heat produced by partially condensing the spent stream, and heat from an external heat source, to form the gaseous working stream.

15. The method of claim 14 further including the steps of reheating and expanding the spent stream, to transform its energy into usable form, and partially evaporating the liquid working stream with heat transferred from the spent stream.

16. The method of claim 15 wherein heat from the partially condensed spent stream is used to preheat the liquid working stream prior to heat from the spent stream being used to partially evaporate the liquid working stream.

17. The method of claim 16 further comprising the step of condensing the partially condensed spent stream, after heat from that stream has been used to preheat the liquid working stream, to produce the liquid working stream.

18. The method of claim 17 further comprising the step of superheating the gaseous working stream prior to expanding the gaseous working stream.

19. The method of claim 18 further comprising the step of pumping the liquid working stream, formed by the condensation of the partially condensed spent stream, to a higher pressure prior to preheating the liquid working stream with heat transferred from the partially condensed spent stream.

20. The method of claim 19 wherein heat from the external heat source is used to evaporate the partially evaporated liquid working stream.

21. The method of claim 20 wherein the external heat source is a fluid stream that exchanges heat with the spent stream to reheat the spent stream prior to expansion of the spent stream, and that exchanges heat with the gaseous working stream to superheat the gaseous working stream, and that exchanges heat with the partially evaporated liquid working stream to completely evaporate the partially evaporated liquid working stream to form the gaseous working stream, and that exchanges heat with the liquid working stream to partially evaporate the liquid working stream to form the partially evaporated liquid working stream.

22. The method of claim 21 wherein the external heat source is a geothermal fluid stream produced by a geothermal source.

23. The method of claim 14 wherein the gaseous working stream, the spent stream, and the oncoming liquid working stream, are each multicomponent working streams that comprises a low-boiling component and a high-boiling component.

24. The method of claim 23 wherein each of the multicomponent working streams contain from about 55% to about 95% of the low-boiling component.

25. Apparatus for implementing a thermodynamic cycle comprising:

means for expanding a gaseous working stream, transforming its energy into usable form and producing a spent stream;

a heat exchanger for partially condensing the spent stream and for transferring heat from the spent stream as it begins to condense to partially evaporate an oncoming liquid working stream;

means for forming the oncoming liquid working stream that begins to evaporate at a temperature that is lower than the temperature at which the spent stream begins to condense; and an external heat source for completely evaporating the oncoming liquid working stream, using heat produced by the external heat source, to form the gaseous working stream.

26. The apparatus of claim 25 further including means for reheating and expanding the spent stream to transform its energy into usable form.

27. The apparatus of claim 26 further comprising a second heat exchanger for transferring heat from the partially condensed spent stream to the liquid working stream to preheat the liquid working stream.

28. The apparatus of claim 27 further comprising a condenser for condensing the partially condensed spent stream after heat from heat stream has been used to preheat the liquid working stream in the second heat exchanger, to produce the liquid working stream.

29. The apparatus of claim 28 further comprising a third heat exchanger for superheating the gaseous working stream prior to the expansion of the gaseous working stream.

30. The apparatus of claim 29 further comprising a pump for pumping the liquid working stream, formed by the condensation of the partially condensed spent stream, to a higher pressure prior to the preheating of the liquid working stream with heat transferred from the partially condensed spent stream in the second heat exchanger.

31. The apparatus of claim 30 further comprising a fourth heat exchanger for transferring heat from the external heat source to evaporate the partially evaporated liquid working stream.

32. The apparatus of claim 31 wherein the external heat source is a fluid stream that exchanges heat with the spent stream to reheat the spent stream prior to expansion f the spent stream, and that exchanges heat with the gaseous working stream to superheat the gaseous working stream, and that exchanges heat with the partially evaporated liquid working stream to completely evaporate the partially evaporated liquid working stream to form the gaseous working stream, ad that exchanges heat with the liquid working stream in a fifth heat exchanger to partially evaporate the liquid working stream to form the partially evaporated liquid working stream.

33. The apparatus of claim 32 wherein the external heat source is a geothermal fluid stream produced by a geothermal source.

* * * * *